G. K. HOFF.
FAUCET.
APPLICATION FILED MAR. 21, 1917.
1,249,090.
Patented Dec. 4, 1917.
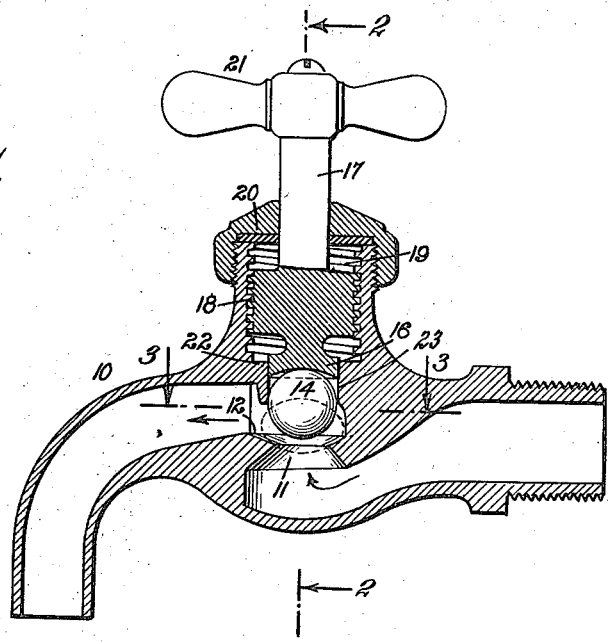
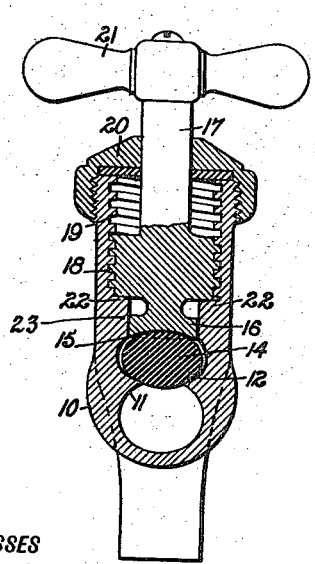
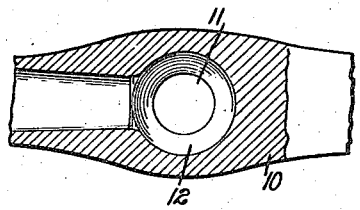
WITNESSES
INVENTOR
George K. Hoff
BY
ATTORNEYS

UNITED STATES PATENT OFFICE.

GEORGE K. HOFF, OF PHILADELPHIA, PENNSYLVANIA, ASSIGNOR TO KANT-LEK FAUCET CO., OF PHILADELPHIA, PENNSYLVANIA, A CORPORATION OF PENNSYLVANIA.

FAUCET.

1,249,090.  Specification of Letters Patent.  Patented Dec. 4, 1917.

Application filed March 21, 1917. Serial No. 156,317.

*To all whom it may concern:*

Be it known that I, GEORGE K. HOFF, a a citizen of the United States, and a resident of Philadelphia, in the county of Philadelphia, and State of Pennsylvania, have invented a new and Improved Faucet, of which the following is a full, clear, and exact description.

The invention relates to a faucet having its valve in the form of a compressible ball adapted to close and open the valve seat.

The object of the invention is to provide a new and improved faucet arranged to prevent leakage, to restrict the compression of the compressible ball valve, to insure uniform wear of the same, to reduce the wear of the seat to a minimum, and to allow of readily replacing the compressible ball valve whenever the same has become worn out.

In order to accomplish the desired result use is made of a faucet body having a valve seat, a ball valve of compressible material controlling the said valve seat, a manually controlled valve stem movable in the said faucet body and adapted to engage the said ball valve to compress the latter on its seat, and means to limit the inward movement of the said valve stem to positively limit the compression of the said ball valve.

A practical embodiment of the invention is represented in the accompanying drawings forming a part of this specification in which similar characters of reference indicate corresponding parts in all the views.

Figure 1 is a longitudinal central section of the faucet;

Fig. 2 is a cross-section of the same on the line 2—2 of Fig. 1; and

Fig. 3 is a sectional plan view of the same with the compressible ball valve removed.

The body 10 of the faucet is provided with a valve seat 11 having a concave face 12 controlled by a ball valve 14 of ebonite or similar suitable compressible material. The top of the ball valve 14 is adapted to be engaged by the convex inner face 15 of a head 16 formed or secured on the reduced inner end of the valve stem 17 provided with threads 18 screwing in corresponding threads 19 formed in the faucet body 10. The stem 17 passes through a suitable stuffing-box 20, and the outer end of the said valve stem 17 is provided with a suitable handle 21 to permit the user to turn the valve stem with a view to screwing it inward or outward according to the direction in which the handle 21 is turned at a time.

The inward movement of the valve stem 17 is limited by a shoulder 22 formed in the faucet body for the inner end of the threaded portion 18 of the stem to abut against and thus limit the inward movement of the valve stem 17. The shoulder 22 is so located relative to the face 12 of the valve seat 11 and the diameter of the ball valve 14 that the latter can only be compressed approximately one-half of its diameter, as indicated in dotted lines in Fig. 1 and in full lines in Fig. 2. By reference to Fig. 1 it will be noticed that the radius of the ball valve 14 is somewhat less than the radii of the concavities of the faces 12 and 15 of the seat 11, and the head 16, respectively. Thus, when the valve stem 17 is screwed inward to its full extent, a proper seating of the compressible ball valve 14 takes place, as the latter is then compressed and firmly seated on the face 12 of the valve seat 11 to prevent leakage. It is understood that, when the valve stem 17 is retracted, the ball valve 14 resumes its spherical shape and the ball valve is lifted off the seat 12 by the force of the outflowing water, which latter tends to turn the ball valve 14, so that when the latter is again moved to its seat other portions of the surface of the ball valve come in contact with the face 12 of the seat 11 and with the face 15 of the head 16.

The head 16 fits snugly into a tubular guide 23 formed in the faucet body 10, and the inner diameter of this guide corresponds approximately to the diameter of the ball valve 14 to prevent accidental displacement of the ball valve and to reduce leakage of the water by way of the threaded portion of the valve.

By the arrangement described a uniform wear of the ball valve 14 is had and it is only necessary to replace the ball valve by a new one after a ball valve has become worn out. By the use of a ball valve of a compressible material the face 12 of the valve seat 11 is subjected to comparatively little wear, and hence remains true practically at all times.

Having thus described my invention, I claim as new and desire to secure by Letters Patent:

A faucet comprising a faucet body having an internally threaded portion terminating at its lower end in a reduced and plain portion forming a tubular guide, a shoulder being formed at the junction of the said portions, and a concave valve seat, a valve stem screwing in the threaded portion of the faucet body and having its inner end reduced to form a head working in the guide and having a concave face adapted to engage the said ball valve directly opposite the said valve seat, the radius of the said ball valve being less than that of the concavity of the said valve seat and the concavity of the said valve stem head, the inner end of the threaded portion of the stem engaging the shoulder of the valve body to limit the inward movement of the said valve stem and thereby limit the compression of the said ball valve.

GEORGE K. HOFF.